United States Patent [19]

Kivari

[11] Patent Number: 5,471,655
[45] Date of Patent: Nov. 28, 1995

[54] METHOD AND APPARATUS FOR OPERATING A RADIOTELEPHONE IN AN EXTENDED STAND-BY MODE OF OPERATION FOR CONSERVING BATTERY POWER

[75] Inventor: Raimo Kivari, Haukipudas, Finland

[73] Assignee: Nokia Mobile Phones Ltd., Salo, Finland

[21] Appl. No.: 162,864

[22] Filed: Dec. 3, 1993

[51] Int. Cl.⁶ .................................................. H04B 1/04
[52] U.S. Cl. ........................................ 455/127; 455/343
[58] Field of Search ................................ 455/343, 38.3, 455/127; 340/825.44

[56] References Cited

U.S. PATENT DOCUMENTS

| | | | |
|---|---|---|---|
| 4,029,900 | 6/1977 | Addeo | 178/69.1 |
| 4,592,076 | 5/1986 | El-Banna | 375/108 |
| 4,777,655 | 10/1988 | Numata et al. | 455/76 |
| 4,903,319 | 2/1990 | Kasai et al. | 455/33.2 |
| 4,912,705 | 3/1990 | Paneth et al. | 370/95.1 |
| 4,977,611 | 12/1990 | Maru | 455/161.2 |
| 5,027,428 | 6/1991 | Ishiguro et al. | 455/67.4 |
| 5,031,231 | 7/1991 | Miyazaki | 455/127 |
| 5,175,874 | 12/1992 | Auchter | 455/89 |
| 5,224,152 | 6/1993 | Harte | 379/59 |
| 5,265,270 | 11/1993 | Stengel et al. | 455/343 |
| 5,278,995 | 1/1994 | Hwang | 455/127 |
| 5,293,639 | 3/1994 | Wilson et al. | 455/127 |

FOREIGN PATENT DOCUMENTS

| | | |
|---|---|---|
| 0255048A3 | 2/1988 | European Pat. Off. |
| 0392079A3 | 10/1990 | European Pat. Off. |

*Primary Examiner*—Edward F. Urban
*Assistant Examiner*—Marsha D. Banks-Harold
*Attorney, Agent, or Firm*—Perman & Green

[57] ABSTRACT

This invention provides a method, and apparatus for performing the method, for reducing the power consumption of a radiotelephone. The method includes the steps of (a) receiving with a receiver of a radiotelephone at least a Word Synchronization pattern from a frame that is transmitted over a control channel; (b) receiving a first repeat of a control message that follows the Word Synchronization pattern within the frame; and (c) determining if the first repeat was correctly received. If the first repeat was correctly received, the method includes a further step of (d) determining if at least one reception-related criteria is met. If the reception-related criteria is determined to be met, the method includes a further step of (e) selectively removing operating power from one or more portions of the radiotelephone receiver for a predetermined time period during a remainder of the frame. The at least one reception-related criteria is a Message Error Rate (MER) that indicates a number of correctly received frames out of a total number of n last received frames. The reception-related criteria may also include a difference between a minimum Received Signal Strength Indicator (RSSI) value and a maximum RSSI value that are detected during a predetermined interval of time.

28 Claims, 7 Drawing Sheets

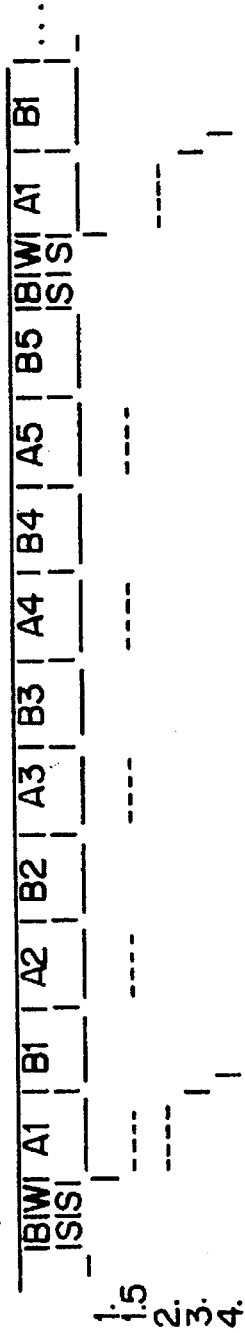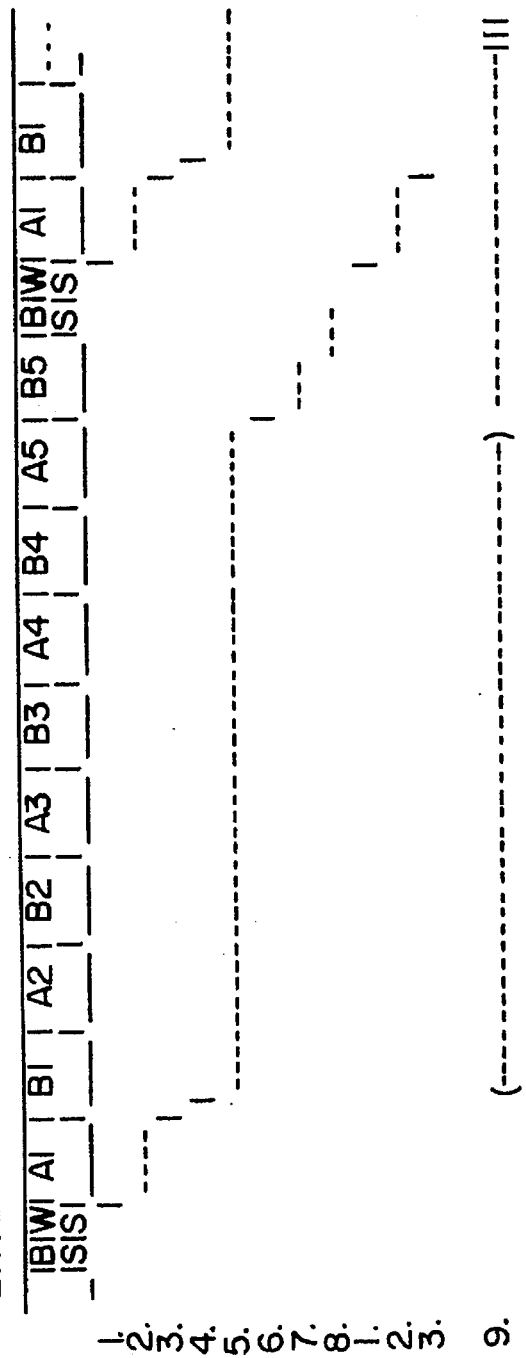

METHOD AND APPARATUS FOR OPERATING A RADIOTELEPHONE IN AN EXTENDED STAND-BY MODE OF OPERATION FOR CONSERVING BATTERY POWER

FIELD OF THE INVENTION

This invention relates generally to cellular telephone power save modes, stand-by modes, and signaling protocols for use on a control channel from a base station to a mobile station. This invention also relates to receivers that are capable of discontinuous operation.

BACKGROUND OF THE INVENTION

FIG. 1 is a simplified block diagram showing a signaling path of a cellular telephone 10. An antenna 12 is coupled to a radio frequency (RF) unit 14. The antenna 12 both receives and transmits RF-signals for accomplishing a telephone connection. A baseband signaling unit (BBS) 16 is interposed between the RF unit 14 and a controlling processor (MCU) 18, typically implemented as a microprocessor-based controller (microcontroller). The baseband signaling unit 16 outputs an analog signal (TX) to the RF unit 14, where TX is used to modulate a suitable RF carrier. The BBS 16 receives an analog signal (RX) that represents a demodulated signal that is received by the antenna 12. Communication between the BBS 16 and the MCU 18 is by digital techniques, and includes an Interrupt signal line (INT), an m-bit address bus, and an n-bit data bus. In operation, the BBS 16 and the MCU 18 implement a selected signaling protocol when transmitting and receiving a telephone communication.

A conventional AMPS signaling protocol and format is described in the EIA Interim Standard IS-3-B, "Cellular System Mobile Station-Land Station Compatibility Specification" (July, 1984), and in The Bell System Technical Journal, vol 58, no. 1, "Advanced Mobile Phone Service" (January; 1979). The AMPS signaling protocol is also specified for use in the EIA/TIA Interim Standard IS-54-B, "Cellular System Dual-Mode Mobile Station-Base Station Compatibility Standard (April, 1992). A TACS signaling protocol is similar to the AMPS, differing primarily in the bit rate (AMPS 10 kbit/s, TACS 8 kbit/s).

In the AMPS protocol, and for a Forward Control Channel (FOCC, or FCC), the signaling is a continuous bit stream from a base station (land station) to a mobile station. The FOCC signaling message (data frame) is 463 bits long, and effectively contains one information word of 28 bits. A data frame actually contains two data streams designated A and B. However, only one of these streams is required by any particular phone, and selection between the two data streams is determined based on the phone's internally stored number. The 28 data bits-(data word) are further encoded with a Bose-Chaudhuri-Hocquenghem (BCH) cyclic code that provides an encoded word of 40 bits (28 bits of data and 12 bits of parity). In the frame this 40 bit string is repeated five times (repeats R1–R5), to provide redundancy against radio channel distortion (fades and impulsive noise). The repeats R1–R5 are collected, ⅗ majority voted, and BCH-decoded, thereby providing error correction and error detection. BCH-decoding can typically correct a one bit error, and can also indicate if the decoded word is faultless (contains no bit errors). The BCH code has a Hamming distance of four and can thus detect up to four errors, if error correction is not used.

Other AMPS/TACS signaling protocols; i.e. a Reverse Control Channel (RECC or RCC) signaling protocol from mobile station to base station, Voice Channel (FVC, RVC) signaling protocols, Voice Channel Signaling Tone (ST), and Voice Channel Supervisory Audio Tone (SAT) are not relevant to this invention, and are not discussed further.

One known implementation of a FOCC signaling receiver provides appropriate filtering of the received signal, data recovery, collecting repeats R1–R5, ⅗ majority voting, and BCH-error correction. After being so processed, the data is provided to the microcontroller. By example, this implementation is found in a circuit known as a UMA1000T DPROC, which is available from Philips/Signetics.

Another example, shown in FIG. 2, has substantially the same functional blocks; i.e., filter, DPLL, Manchester-decoder, ⅗ majority voting and BCH error-correction. In this implementation a Control register (CREG) 20 includes registers for controlling the circuit operation. Internal clocks are generated from an input clock in block CLOCKDIV 22. The input node (DI) provides a received data signal to a low-pass filter (AAFIL) 24. The data is connected through a comparator (DATACOMP) 26 to a Manchester decoder (MANDEC) 28, which decodes the Manchester encoded data to a NRZ (None Return to Zero) format.

The signaling circuit is bit synchronized to the received data with a digital phase locked loop (DPLL) 30, and is frame synchronized with a Word Synchronization (eleven bits long WS-pattern) detection logic block (RECBUF) 32. The bandwidth of the DPLL 30 is controlled to obtain optimum performance under different operating conditions. By example, the DPLL 30 can be set to a wider bandwidth for fast bit synchronization, for example when going to a control channel for the first time, or in the case where synchronization is lost. In this case the block RECBUF 32 searches for the Word Synchronization pattern (typically called a "Hunt Mode").

The serial data from the MANDEC 28 is ⅗ majority voted (repeats R1–R5) in block VOTE 34, BCH decoded in block BCH 36, bit error corrected by block CORR 38, and shifted into a receiver register (RREG) 40. A final data word comprises 28 bits. Four status bits are added to RREG 40 to make up a 32 bit register, which is read by the microcontroller 18 in 8-bit bytes, via status multiplexer (SMUX) 42.

A receiver timing block (RECTIM) 44 extracts the data from received frames on the control channel and generates data transfer interrupts (WFLAG). RECTIM 44 also separates the time-multiplexed data streams (channel A and B) and Busy/Idle-information (XBOI) on the control channel. RECTIM 44 maintains bit and word synchronization during different frames and passes the synchronization status (SFLAG) forward to the status register of SMUX 42 and MCU 18. A repeat flag (RFLAG) can be used to indicate the end of each received repeat of the data word.

In accordance with the AMPS FOCC signaling format, and the signaling circuit receiver block diagram of FIG. 2, the following operations are performed. Initialization involves setting the FOCC channel, selecting the A or B bit stream, and initiating the "Hunt Mode". Reception is started when the first Word Synchronization (WS) pattern is found by RECBUF 32. The DPLL 30 thereafter maintains bit synchronization, and VOTE 34 collects all five repeats (R1–R5) of the data word. Block RECTIM 44 controls receiver timing and frame control. For example, RECTIM 44 controls the timing of VOTE 34 as to when to collect repeat data and when not to collect the data. Block VOTE 34 performs the ⅗ majority vote of the collected repeats, and blocks BCH 36 and CORR 38 then BCH-decode and correct the voted data, respectively. The result is saved in block RREG 40. Status flag WFLAG is set to interrupt the processor 18 in order to indicate that received data is processed and is ready to be read from the RREG 40.

In that the FOCC signaling protocol is a continuous 463 bit long frame, and in that the frame is continuously repeated, one can clearly see that the mobile phone receiver must continuously receive the FOCC bit stream. Thus, the receiver circuitry is continuously operating, and is therefore continuously consuming current.

The reduction of this current consumption is an important goal in a radiotelephone, particularly in hand-portable phones. By default, the transmitter is turned off when the phone is not in conversation mode, so only the receiver is consuming power. This mode is called stand-by mode, or a normal receiving mode in this context.

One method to reduce the receiver power consumption is described by Harte in U.S. Pat. No. 5,224,152, "Power Saving Arrangement and Method in Portable Cellular Telephone System", issued Jun. 29, 1993 In this method the receiver operates discontinuously, and power is saved by decoupling the power supply from some components for certain periods of time. However, certain aspects of this approach lead to a less than optimum solution to reducing receiver power. For example, received words are BCH-decoded by a microprocessor, which consumes a considerable amount of power. Also, the disclosure of Harte does not specify how to implement an optimal system solution, i.e. from which circuits is the power removed, how, and how quickly these circuits can be recovered/initialized when power is switched on again. Similar problems exist for the RF circuitry.

A further drawback to this approach becomes apparent if the parity of BCH-decoded first word is not correct. In this case the next word is received and BCH-decoded. As a result, in a worst case all five individual repeats of the word in the frame must be received and BCH-decoded by the microprocessor, thereby consuming considerable power. Another perceived drawback to this approach is that power can be saved only in the case that the message is intended for another mobile phone. For instance, if there are only a few messages to other mobile phones, the power save mode can be entered only occasionally and, thus, does not provide a significant benefit.

Another method to reduce the power consumption is described by Auchter in U.S. Pat. No. 5,175,874 "Radiotelephone Message Processing for Low Power Operation", issued Dec. 29, 1992. In this method the receiver operates discontinuously, but again certain aspects lead to a less than optimum solution to reducing power consumption. By example, at least two data words are received. As a result, the earliest possible moment to shut the receiver off is after the second (or later) repeat of the data word. Additionally, the two data words are compared to each other. The comparison operation itself consumes power, and also causes an additional delay before the receiver can be shut off.

It is noted that with mobile telephones the quality and strength of a received signal can vary within a wide range, depending on field strength, fades, disturbances, etc. The use of discontinuous receiving, however, is best employed under optimum receiving conditions.

For example, if the receiver is switched off the next frame is captured only if the next Word Sync pattern is detected. However, if there is one or more bit error(s) in the Word Sync pattern the next frame may be lost, thereby increasing a Message Error Rate.

Another technique to reduce power consumption is described in U.S. Pat. No. 4,777,655, wherein the power saving is limited to the frequency divider portion of receiver. Moreover, as one of the data stream groups (A or B) is being received, a prescaler must be turned on during the other one of the data stream groups to avoid problems during an initial unstable operation of a PLL synthesizer. Furthermore, all data repeats of a selected data stream group (A or B) are received, i.e. the receiver of the phone is continuously operating, and only the frequency divider portion can be set to the power save state.

SUMMARY OF THE INVENTION

It is therefore a first object of this invention to provide a method and apparatus to reduce the power consumption of a radiotelephone, while overcoming the problems inherent in the approaches suggested by the prior art.

The foregoing and other problems are overcome and the first object of the invention is realized by a radio telephone, or mobile station that is operable on AMPS (Advanced Mobile Phone Services), DAMPS (Dual-Mode AMPS, or Digital AMPS), or TACS (Total Access Communication System) cellular telephone systems and signaling protocols. Signaling messages, both data messages and supervisory related signals between a base station and a cellular telephone microcontroller (MCU), are transferred via a Radio Frequency (RF) unit and a baseband signaling unit. In the mobile station receiver the RF unit and baseband signaling unit can operate continuously, i.e. receive continuous signaling message from the base station, or optionally use a discontinuous receiving mode, according to this invention.

During the discontinuous receiving mode some receiver circuits (for example, RF, baseband, and controller) are selectively switched off, or set to a stand-by mode, at suitable time periods to minimize power consumption.

In accordance with the invention, discontinuous receiving is referred to as extended stand-by (XSTBY) mode of operation. In the extended stand-by mode the power consumption is significantly reduced over a conventional stand-by mode (where only the transmitter is turned off).

Accordingly, a further object of this invention is to overcome the before-mentioned problems, and to provide a method and apparatus that conserves power when operating in a stand-by mode, referred to herein as the extended stand-by (XSTBY) mode. The extended stand-by mode is employed when a cellular telephone in on the Forward Control channel (FOCC).

Testing of the BCH-decoded result (parity) of individual repeats occurs without consuming excessive power when receiving and BCH-decoding the repeats, even for the case where the decoding result is not positive. The extended stand-by mode may be used with all message types, and not only with messages intended for other phones.

A further object of this present invention is to provide an optimal method for interfacing between the signaling circuit and the controller, such that the signaling message repeats can be ⅗ majority voted and BCH-decoded in the signaling circuit logic, or single message repeats, (specifically a first repeat) can be BCH-decoded in the signaling circuit or in the controller.

Another object of this invention is to provide an optimal method for implementing the control of the receiver RF circuitry to operate discontinuously, with extended stand-by, with minimized power consumption.

A still further object of this invention is to provide a method to determine when extended stand-by can be used. A presently preferred embodiment employs a Message Error Rate (MER), both in normal receiving mode and in the extended stand-by receiving mode. A variation in a Received Signal Strength Indicator (RSSI) value can also be monitored for this purpose.

More particularly, this invention provides a method, and apparatus for performing the method, for reducing the power consumption of a radiotelephone. The method includes the steps of (a) receiving with a receiver of a radiotelephone at least a Word Synchronization pattern from a frame that is transmitted over a control channel; (b) receiving a first repeat of a control message that follows the Word Synchronization pattern within the frame; and (c) determining if the first repeat was correctly received. If the first repeat was correctly received, the method includes a further step of (d) determining if at least one reception-related criteria is met. If the reception-related criteria is determined to be met, the method includes a further step of (e) selectively removing operating power from one or more portions of the radiotelephone receiver for a predetermined time period during a remainder of the frame.

The at least one reception-related criteria is a Message Error Rate (MER) that indicates a number of correctly received frames out of a total number of n last received frames. The reception-related criteria may also include a difference value between a minimum Received Signal Strength Indicator (RSSI) value and a maximum RSSI value that are detected during a predetermined interval of time. For this latter case, the at least one reception-related criteria is determined to be met if the MER is below a predetermined first threshold, and if the RSSI difference value is below a predetermined second threshold.

The step of receiving the Word Synchronization pattern preferably includes a preliminary step of receiving a dotting sequence that precedes the Word Synchronization pattern. The step of receiving at least a Word Synchronization pattern also includes a further step of generating an interrupt signal for causing a data processor control unit of the radiotelephone to transition from a low power (standby) state to an operational state. The interrupt signal can be generated only upon an occurrence of a reception of both the dotting sequence and also the Word Synchronization pattern. This mode of operation avoids a problem that may be encountered if the control message includes an embedded Word Synchronization pattern.

In a presently preferred embodiment of this invention the steps of receiving the Word Synchronization pattern and receiving the first repeat are accomplished with circuitry that is external to the data processor control unit.

More particularly, the step of determining if the first repeat is correctly received includes the steps of: BCH-decoding the received first repeat and generating at least one status signal; generating an interrupt signal for causing the data processor control unit to transition from a low power state to an operational state; and reading the at least one status signal into the data processor control unit, the at least one status signal indicating if the control message was received with at least one bit error, or was received with no bit errors.

It is also within the scope of this invention to execute the step of determining if the first repeat is correctly received by the steps of: generating an interrupt signal for causing the data processor control unit to transition from the low power state to the operational state; reading the received first repeat into the data processor control unit; and BCH-decoding the first repeat with the data processor control unit to determine if the control message was received with at least one bit error, or was received with no bit errors.

BRIEF DESCRIPTION OF THE DRAWINGS

The above set forth and other features of the invention are made more apparent in the ensuing Detailed Description of the Invention when read in conjunction with the attached Drawings, wherein:

FIGS. 4a and 4b show an example of FOCC frame timing, wherein FIG. 4a shows a conventional, continuous receiving state and FIG. 4b shows an extended standby receiving state in accordance with this invention;

DETAILED DESCRIPTION OF THE INVENTION

As employed herein, the following terms have the following meanings.

A stand-by state (STBY) of a radiotelephone means a conventional stand-by condition, where the radiotelephone waits to receive a telephone call. During this time the phone receives, continuously, the Forward Control Channel (FOCC) signaling stream from the assigned base station.

An extended stand-by state (XSTBY) of the radiotelephone, in accordance with this invention, means that the receiver of the radiotelephone operates discontinuously during a standby state, so that the reception of FOCC signaling is interrupted during a FOCC frame. Typically this results in only a first data repeat in the FOCC frame being received, while the remainder of the repeats (2–5) are not received.

Information concerning the cellular network behavior and FOCC messages is found in, by example, the above-referenced EIA/TIA publication IS-54-B, specifically chapter 3.7, Signaling Formats. This chapter shows the general frame structure, and subchapters 3.7.1.x specify different messages that are transmitted from a land station to a mobile station.

In the preferred embodiment of this invention the circuits that consume the greatest amount of power are placed in a power save mode as much of the time as possible. These circuits include the RF circuits 14 and the controller (MCU) 18. If some functions for receiving signaling messages are implemented with digital logic, for example within an ASIC (Application Specific Integrated Circuit), these circuits will consume, typically, much less power than the MCU 18.

It is thus advantageous to provide a method to divide the functionality between the MCU 18 and the ASIC-circuit, such that the MCU 18 can be kept in the power save mode as much as possible.

Figure 1:
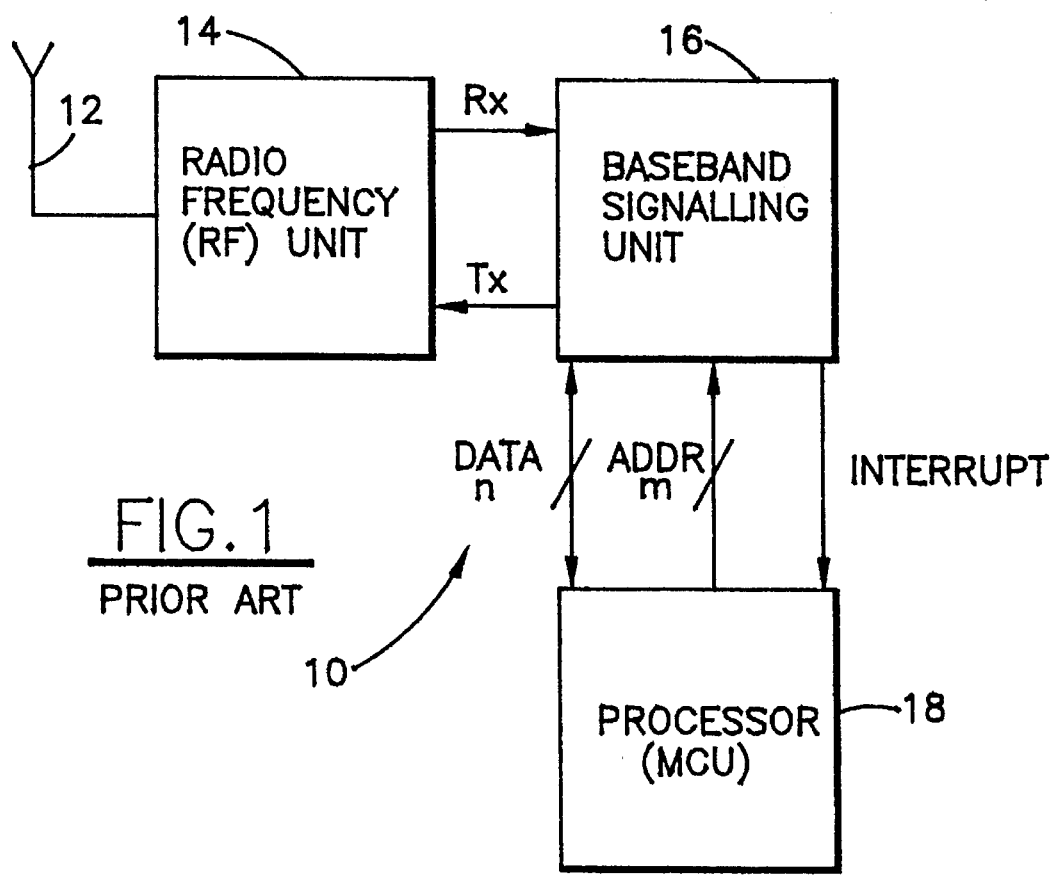
FIG. 1 is a simplified block diagram of a conventional cellular radiotelephone.
Figure 2:
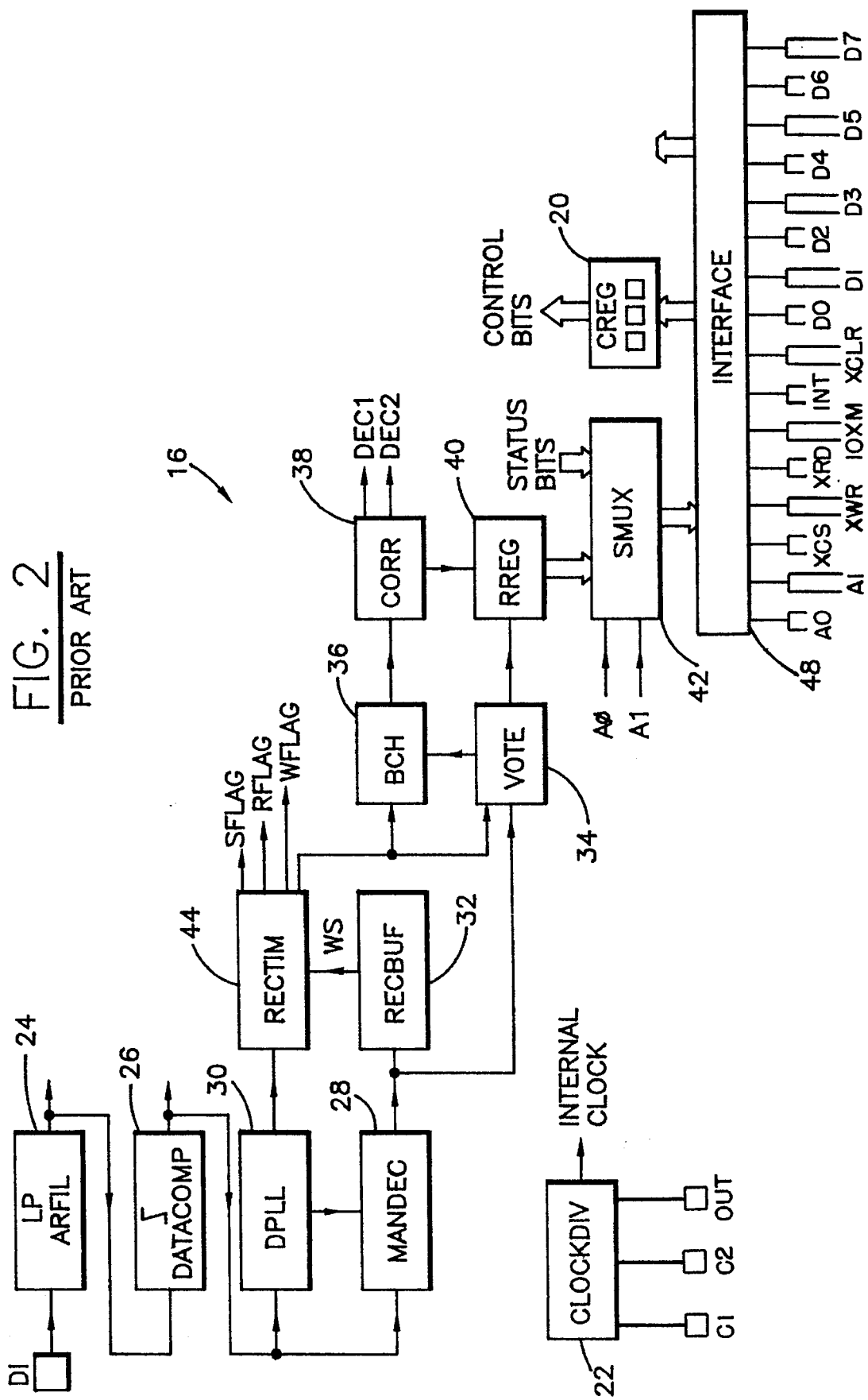
FIG. 2 is a block diagram of a conventional AMPS/TACS signaling circuit.
Figure 3A:
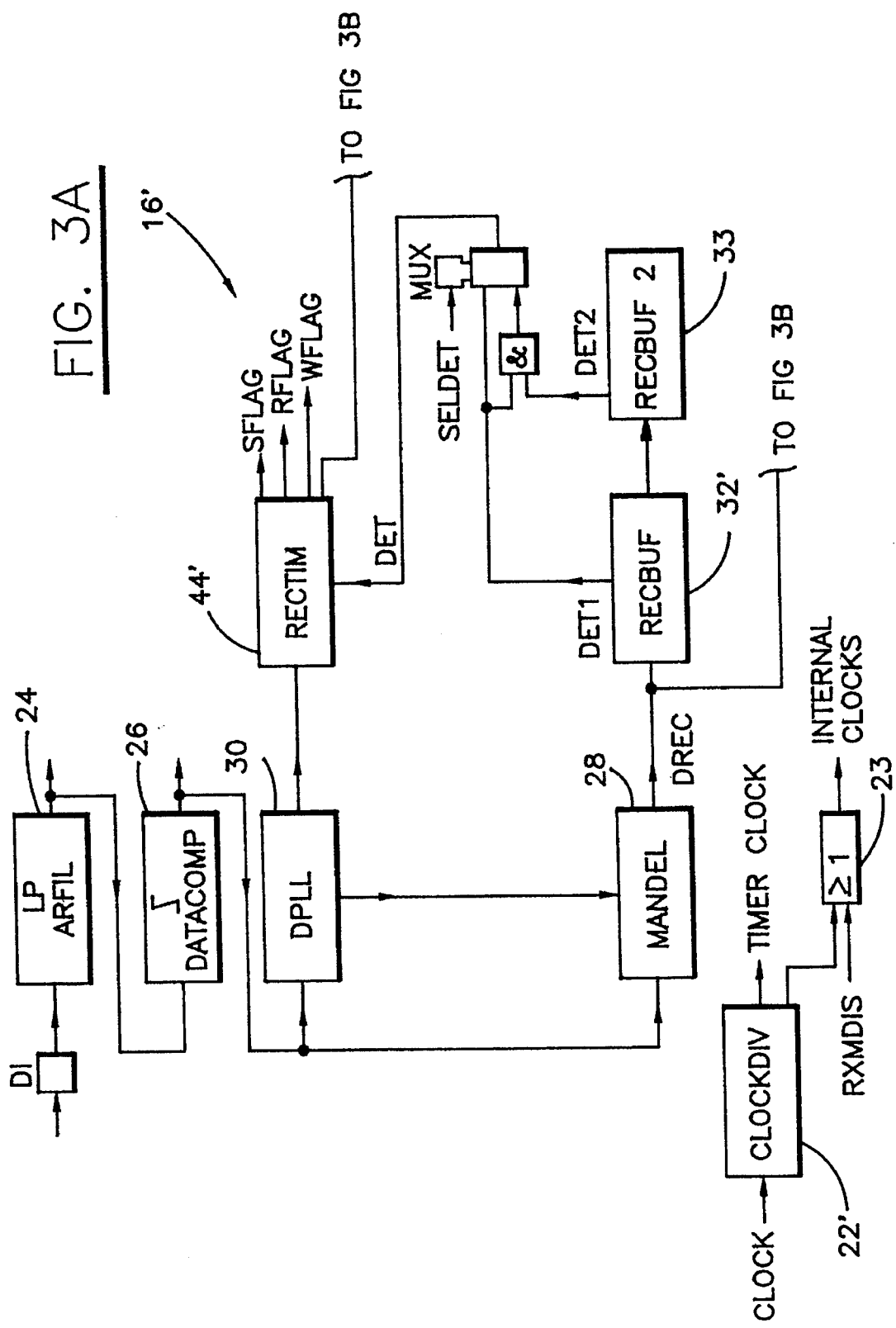
FIGS. 3a and 3b are a block diagram of a signaling circuit that is constructed and operated in accordance with this invention to enable the use of the extended stand-by mode of operation.
Figure 3B:
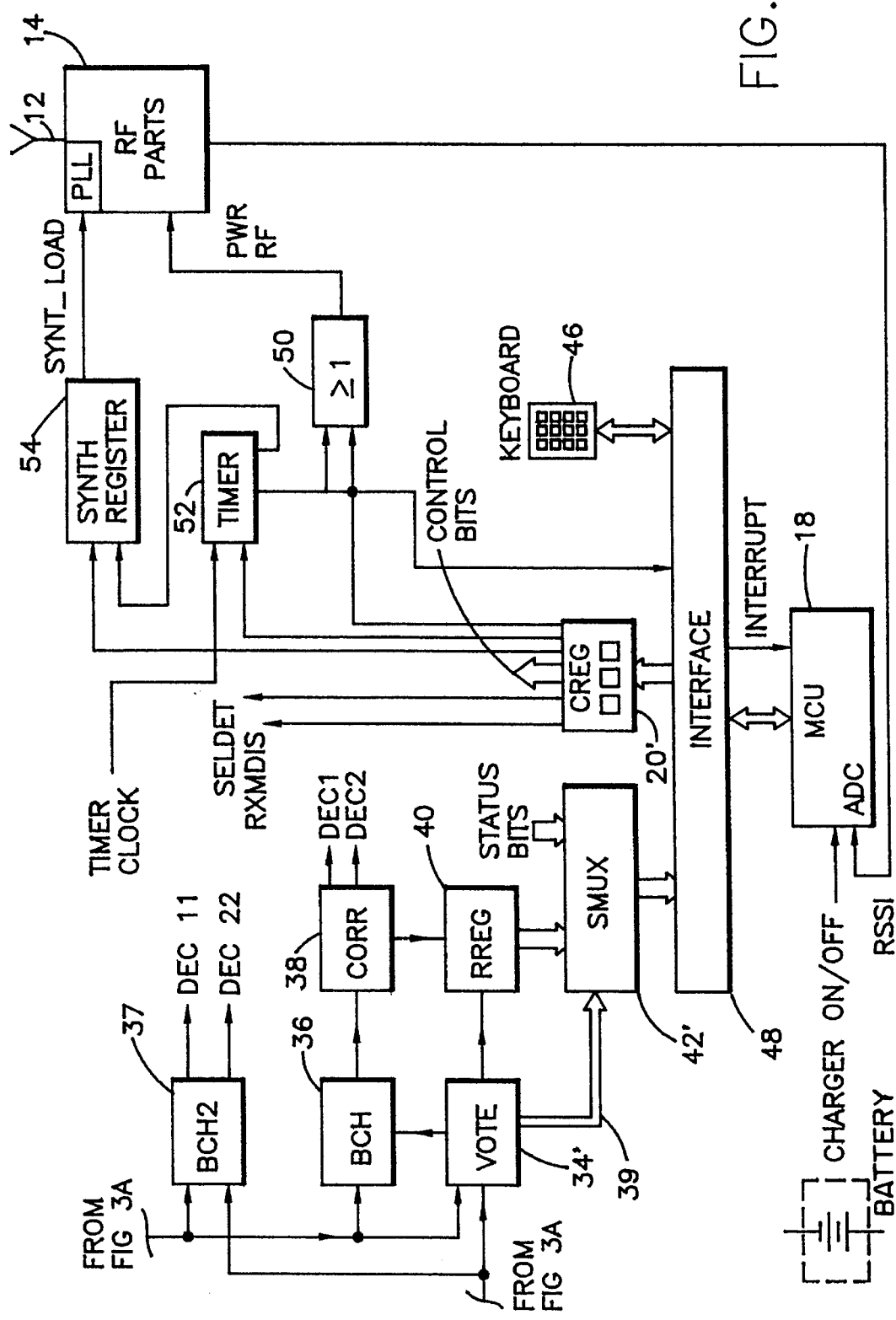

FIGS. 3a and 3b are a block diagram of a presently preferred embodiment of a baseband signaling unit 16'. Components that function identically to those in the baseband signaling unit 16 of FIG. 2 are numbered accordingly. Components that function differently are designated with a primed (') numeral, or with a numeral not found in FIG. 2. It should be realized that a considerable number of the digital circuit blocks shown in FIGS. 3a and 3b may be implemented within one or more ASICs.

In a normal receiving mode, and as described previously, the received data stream is Manchester-decoded (MANDEC), all five repeats of the Word are ⅗ majority voted (VOTE), and the voting result (voted word) is BCH-decoded (BCH), and possibly one bit error corrected (CORR), and the final word is available to be read in register (RREG).

FIG. 4a is a timing diagram of this operation, and shows that the voting result is ready after receiving the fifth repeat of the word, and the voted word is BCH-decoded and error-corrected during the first repeat of the second frame (i.e., during the next frame). The BCH-decoded data and corresponding status bits (DEC1, DEC2) of the data of the first frame are available by the end of the first repeat of the second frame to be read by the MCU 18. Status bits DEC1 and DEC2 indicate whether the BCH-decoded data is faultless (no bit errors), or if a one bit error was corrected by BCH-decoding, or if the data remains faulty (more than one bit in error). The DEC1 and DEC2 status bits are interpreted as follows.

| DEC2 | DEC1 | Indication |
|---|---|---|
| 0 | 0 | many errors, data is faulty |
| 0 | 1 | one bit error (corrected) |
| 1 | 0 | no bit errors |

More particularly, the timing indicated in FIG. 4a is as follows:

1. synchronization status is updated, at the expected WS pattern position;
1.5 the signaling circuit receives A1 . . . A5, and ⅗ majority votes;
2. the signaling circuit BCH-decodes (and error-corrects) the ⅗ voted data;
3. the WFLAG interrupt occurs; and
4. the MCU 18 reads the data (⅗ voted, BCH-decoded) and decodes the status bits DEC1 and DEC2.

In FIGS. 4a and 4b the following nomenclature is used.
BS=Bit Synchronization pattern (Dotting)
WS=Word Synchronization pattern
A1 . . . A5=Bit stream A, repeats R1 . . . R5 (channel A)
B1 . . . B5=Bit stream B, repeats R1 . . . R5 (channel B)

In FIG. 4a the timing and interrupt information is referenced to the FOCC channel A. The B channel is similar, except that the WFLAG interrupt occurs just after B1, instead of A1.

Reference is now made to FIG. 4b for showing a timing diagram of the XSTBY state of this invention. In FIG. 4b the timing is as follows:

1. the WS pattern is detected;
2. the signaling circuit receives and BCH-decodes the first repeat (A1);
3. the WFLAG interrupt is generated;
4. the MCU 18 reads the A1 data and BCH-decoding status and checks the MER: if the BCH-decoding status and MER are acceptable, the MCU 18 turns off the receiver power, sets timer 52, causes the signaling circuit to enter power save, and sets itself to the power save mode (the MCU 18 may also reset and restart a back-up timer);
5. the timer 52 is running during this period;
6. the timer expires and the receiver is turned on (frequency synthesizer values are loaded if required);
7. the RF circuitry 14 settles; and
8. the signaling circuit DPLL 30 synchronizes to the received data bits.
9. The back-up timer expires during the next frame if WFLAG is not detected. The back-up timer is set (started) by the previous WFLAG (at 4.), or when the receiver is once again turned on (at 6.).

In the case of normal continuous receiving (STBY), the BCH-decoding of the previous frame is accomplished during the first repeat of the next frame. That is, at the same time that the signaling circuit is receiving the first repeat of the second frame to the VOTE block 34' register, after which the signaling circuit receives the consecutive repeats (2–5) to be ⅗ majority voted etc., just as during the first frame. In this description the first frame can be any n:th frame, and the second frame is then the (n+1):th frame.

According to an aspect of this invention another BCH-decoding block (BCH2) 37 is added, and is used to BCH-decode specifically and only the first repeat of the FOCC message word, and not the ⅗ majority voted word. BCH-decoding is accomplished for the bit stream (first repeat) output by the MANDEC 28, and decoding takes place during the first repeat of the word.

The 12 parity bits of the 40 bit long string are used to BCH-decode the Repeat 1 (R1). In practice, this means that 12 parity bits are used to determine whether the 28 data bits contain bit errors. As mentioned earlier, the BCH-code can be used to correct a bit error, and additionally indicate if the 28 data bits are faultless. Alternatively, the BCH code can be used to detect up to four bit errors (Hamming distance) if error correction is not used. According to the preferred embodiment of this invention, and when BCH-decoding just the first repeat, the BCH2 37 operates in the mode of detecting up to four bit errors, and not the single bit error correction mode. The decoding result is indicated by status signals DEC12 and DEC22, and is available by the end of the first repeat. The data word (28 data bits in repeat 1) is available to be read from the VOTE block 34, via a data path 39 and the SMUX 42'.

In that the Hamming code enables a detection of up to four bit errors, and in that error correction is not employed for DEC11 and DEC22, only the DEC22 bit need be considered as follows.

| DEC22 | Indication |
|---|---|
| 0 | at least one bit error |
| 1 | no bit errors |

If the Repeat 1 does not contain bit errors, it can be conditionally accepted as valid. In that the other repeats (2–5) are not required, the MCU 18 then totally removes, or alternatively reduces, the supply voltage to the receiver RF circuitry and possibly also to the baseband circuitry; it being realized that the RF circuit current consumption is dominant.

The MCU 18, or some other associated circuit, includes a timer 52 to indicate when the receiver must be turned on again. A preferred time to turn the receiver on again is before the beginning of the next frame. This provides the RF circuitry sufficient time to settle properly on the selected channel. If the baseband circuitry is also placed in a low power consumption mode, then sufficient time must also be allotted to enable the baseband circuitry to settle; for example, to enable the DPLL 30 to lock on to the incoming bit stream. Preferably, the receiver and baseband circuitry must be settled before the occurrence of the Word Synchronization (WS) pattern, so that proper frame timing can be obtained.

The block RECBUF 32' detects the Word Sync pattern in the beginning of the next frame, and receiving of the next frame is initiated. The block BCH2 37 BCH-decodes the first repeat as it is being received, and by the end of the first repeat the WFLAG interrupt signals the MCU 18 to read the data and decode the result (at least status bit DEC22). If the first repeat is free from bit errors, the receiver circuitry can be turned off (or operated with reduced power) and the remaining repeats are ignored, just as before.

For the case where Repeat 1 does contain bit errors; a decision is made that the receipt of the frame must continue in normal manner, i.e., to collect all five repeats, ⅗ vote, and BCH-decode the voted result.

It should be noted out that the testing of Repeat 1 does not affect or otherwise prevent receiving the entire frame in a conventional manner.

It is advantageous that the BCH-decoding result of the first repeat is available at the same time as was the BCH-decoding result of the ⅗ voted word of the frame. This greatly facilitates the transition from normal continuous receiving to discontinuous receiving (extended stand-by, XSTBY), and with minimum power consumption, because the MCU 18 can read both the voted, BCH-decoded message (which is originated from the previous frame) and the BCH-decoded first repeat of the next frame with the same WFLAG interrupt. As a result, the total number of interrupts is minimized, as is thus also the MCU 18 power consumption.

In greater detail, during normal continuous receiving minimum power consumption is achieved by receiving all five repeats, ⅗ voting the five repeats, and BCH-decoding the voting result in the signaling circuit. During this time the MCU 18 can be maintained in the stand-by condition. Voting occurs during the fifth repeat of the frame, and BCH-decoding during the first repeat of the next frame. At the end of this first repeat of the next frame the WFLAG interrupt is generated to cause the MCU 18 to transition from the stand-by (minimum power consumption mode) to the operational mode. The MCU 18 can then read the already processed word and decoding result, and take the action indicated by the message (if any MCU 18 action is required). The MCU 18 then goes back to stand-by to wait for the next WFLAG interrupt.

According to present invention, the transition from normal receiving to discontinuous receiving is initiated by the Word Flag (WFLAG) interrupt. When the MCU 18 is activated by the WFLAG interrupt, the MCU 18 reads the ⅗ voted and BCH-decoded data of the previous frame (which was received in a conventional manner), and as well the BCH-decoded data of the first repeat of the next frame. This saves a significant amount of power, because the MCU 18 has been held in stand-by during the previous frame and also the first repeat of the next frame. Furthermore, if the previous frame message requires no action, and if the decoding result of the first repeat of the next frame (DEC11, DEC22) does not indicate an error, the extended stand-by power save mode is entered and the receiver turned off.

As has been explained, the receiver is turned off if the first repeat of the next frame is free from bit errors, and if the message, or any other interface such as the keypad 46, requires no special action. It should be noted that it is not required to check whether the message is intended for another telephone, as occurs in at least one of the other techniques referred to earlier.

For comparison, one clear advantage over the other techniques is that the MCU 18 is maintained in stand-by for a considerable amount of time, and is brought out of stand-by only to read an incoming message. Typically, the circuitry receiving and BCH-decoding the message consumes a current of less than four milliamps, whereas the MCU 18 consumes a typical current in the range of 5 to 20 milliamps. Only one interrupt is required per frame, independent of whether reception occurs normally/continuously or discontinuously. The MIN of the received word (MINr) is not compared to the pre-stored MIN (MINs). This saves execution time and power of the MCU 18, as well power in the receiver RF circuitry 14, because the receiver can be turned off immediately, without waiting for the comparison result. One advantage of this extended stand-by mode of operation is that the usability ratio of extended stand-by is significantly higher than with the approaches of the prior art.

For example, one previous technique referred to above uses power save only with messages intended for another station, but as was previously stated, it produces a minimal power savings, and only in a busy network.

Another previous technique that was referred to above employs a power save mode only after receiving at least two data repeats. However, and as described previously, the power saving is not as extensive as that provided by this invention, because (a) the receiver is on until at least two data repeats are received; (b) the receiver is on during the comparison of the two repeats; and (c) the comparison itself consumes power.

In the present invention the receiver is turned off immediately after determining that the first repeat is free of bit errors. If the first repeat contains bit errors, then preferably all five repeats are received in a conventional manner. In practice, the first repeat is typically free of errors, and if it is not, receiving all five repeats and voting them will typically correct the error.

In this invention the extended stand-by mode is used only on paging channels (not on access channels), and when the radiotelephone (mobile station) and controller are in an IDLE mode (settled on paging channel, in SERV).

A further object of the present invention, the flexible interface between the signaling circuit and MCU 18, is fulfilled by providing a number of options for reading the received message. As was described, conventional techniques read the ⅗ voted, BCH-decoded data message and status bits (DEC1, DEC2). However, and according to this invention, it is possible to read also the 28 data bits of the first repeat and the status bits (DEC11, DEC22) showing the BCH-decoding result. Furthermore, this reading of the first repeat can occur by the same WFLAG interrupt that enables the DEC1 and DEC2 status bits to be read. Status bits (DEC11, DEC22) are read from the BCH2 37, and the data bits are read from the VOTE block 34', via the data path 39, SMUX 42' and the interface 48.

Reading the data bits from the VOTE block 34' is possible because the VOTE block 34' collects in a plurality of registers the repeats that are to be ⅗ majority voted. Reading of the first repeat is made possible by providing multiplexers that feed the data path 39 from the VOTE block 34' to the MCU interface 48, via block SMUX 42'. The data bits of the first repeat are read by the MCU 18 before they become overwritten by other repeats or the 3/5 voting result.

This option to read the VOTE block 34' register also provides the capability to read the entire first repeat, both the 28 data bits and 12 parity bits, with the MCU 18 and to then BCH-decode the first repeat in the MCU 18. Although this consumes more power than BCH-decoding the first repeat in the BCH2 37, it enables other functions to be readily accomplished by MCU software, such as the error correction mode instead of only the error detection mode that is performed by the BCH2 37.

The third object of the present invention, optimal RF-control with minimum power consumption, is achieved by specific allocation of functions between the signaling circuit and MCU 18. This is explained in greater detail below, by describing a preferred method of powering the receiver circuitry on and off.

According to the presently preferred embodiment, the MCU 18 can selectively remove power from the receiver, including the RF block 14. This is accomplished by a control signal PWR_RF that is generated by a gate 50 in conjunction with the timer circuit 52 and a bit from CREG 20'. The PWR_RF signal removes the power from the RF circuit 14 by cutting the supply voltage provided from the output of a voltage regulator (not shown). In addition to turning the RF power off, the MCU 18 may also set the baseband components to a power save mode. This is most readily accomplished by stopping the clock signal to those blocks of the signaling circuit which are not required, such as the blocks DPLL 30, MANDEC 28, RECTIM 44', VOTE 34', and BCH 36 Signal RXMDIS, output from the CREG 20', is used for this purpose in conjunction with a gate 23 that also receives a clock output from the Clock Divider 22'.

Although the clock to the signaling circuit's internal blocks is stopped in the XSTBY mode, the timer 52 clock that is output from a Clock Divider 22' continues to run, because the timer expiration causes the receiver to be turned on again.

After placing the receiver in the low power consumption XSTBY mode, the MCU 18 then enters the stand-by mode to conserve additional power. Preferably, the MCU 18 first programs the timer 52 to insure that the receiver circuitry will be re-activated before the beginning of the first repeat of the next frame. Entry of the stand-by mode is generally accomplished by the execution of a specific MCU instruction.

According to a presently preferred embodiment of the invention, when the timer 52 expires the signaling circuit itself turns the receiver RF circuitry 14 on again using, for example, the PWR_RF signal line via gate 50. This provides the advantage that MCU 18 is not required to be reactivated until the next WFLAG interrupt occurs, which means that MCU 18 is reactivated only once per frame.

In a second embodiment the MCU 18 is reactivated by the timer 52 and then turns on the receiver RF circuitry 14. After enabling the RF circuitry, the MCU 18 returns to the stand-by mode to wait for the WFLAG interrupt. This embodiment provides more operational flexibility, but consumes more power than the first embodiment because the MCU 18 is activated twice per frame.

Typically, a frequency synthesizer phased locked loop (PLL) has frequency divider values that are lost when the power is removed from the RF circuitry 14. This implies that the PLL frequency divider values must be reloaded once per frame after the RF power is turned on. Preferably, the reloading of the PLL frequency divider values is accomplished by the signaling circuit with a signal SYNT_LOAD that is generated by a synthesizer register circuit 54. The synthesizer register circuit 54 also stores the required PLL frequency divider values. These values are initially provided by the MCU 18 when the mobile station is first settled on the paging channel.

In a presently preferred embodiment of this invention the synthesizer circuit is known as a PMB2306, which is commercially available from Siemens.

In accordance with the second embodiment, wherein the MCU 18 is reactivated twice per frame to turn on the RF circuit power, the MCU 18 may also provide the frequency divider values either directly to the RF synthesizer or indirectly via the signaling circuit.

It is also within the scope of the invention to not remove power from the synthesizer PLL when the RF circuitry 14 is powered off. This provides the advantage that no reloading of the frequency divider values is required. The additional power consumption due to the synthesizer PLL may be offset by the savings in power in not requiring the synthesizer register 54, or requiring the MCU 18 to reload the PLL frequency divider values.

A further object of the invention is realized by a method of detecting and determining when the XSTBY mode can be used. This is accomplished by determining the presence of one or more predetermined criteria, preferably the Message Error Rate (MER) either alone, or in combination with a determination of a difference in a variation of a Received Signal Strength Indicator (RSSI) signal.

In this regard it should be realized that once proper frame synchronization is achieved during normal and continuous receiving, frame synchronization can be maintained by counting bits in the frame being received (463 bits per frame) and thus detecting the end of one frame and the beginning of the next. As a result, frame synchronization can be maintained even if an error occurs in the Word Sync pattern. Frame synchronization is determined to be lost, by example, only if the BCH-decoding status shows a failure in two consecutive frames in conjunction with the Word Sync status being in error.

As such, it can be appreciated that discontinuous receiving, including the XSTBY mode of the present invention, increases the risk of losing frames. This is because bit counting within a frame cannot be accomplished when the receiver circuits are powered down. As a result, it becomes necessary to detect the Word Sync pattern at the beginning of each frame.

The reliable detection of the Word Sync pattern requires a good signal strength and an absence of fades and other disturbances. Although it may appear that the RSSI signal may be adequate for this purpose, just one or a few samples of the RSSI signal typically will not indicate the presence of rapid signal strength variations, such as those caused by fades and interference from a disturbing radio frequency signal on the same channel. That is, although the received RF signal may be strong, the actual data signal strength could be very weak.

As a result, the use of the RSSI signal in and of itself does not provide a reliable indication of when the XSTBY mode can be entered.

In a presently preferred embodiment of the invention the Message Error Rate (MER) is employed to determine when to initiate and terminate the XSTBY mode of operation. The RSSI signal may be used in conjunction with the MER, but is not used as a primary determinant of whether to enter the XSTBY mode of operation.

By example, one typical condition for enabling the XSTBY mode is when the radiotelephone is in SERV (idle mode) and is receiving FOCC signaling on the paging channel, and when the radiotelephone is not coupled to a battery charger. If the radiotelephone is connected to a battery charger, there is no advantage to be gained by operating in the low power mode. Whether or not the radiotelephone is coupled to a battery charger can be indicated by a control signal (Charger On/Off) that is input to the MCU 18.

When the use of the XSTBY mode is called for, the MER is determined as follows. After each frame is received, the result of the BCH-decoding is determined, and also the Word Sync status can be tested. By collecting this information over many frames the ratio of erroneous frames to all received frames can be determined. This ratio is the MER. If the MER is below a predetermined threshold value, the XSTBY mode is enabled for use.

In accordance with one preferred embodiment of this invention, the MER is determined by using both the BCH-decoding status and the Word Sync status. The MER is required to be zero out of n last received frames. The value of n can be variably set within a range of, by example, 5–255 frames.

In accordance with another embodiment, the MER is determined during discontinuous reception (XSTBY), and the determined value is used to indicate whether the XSTBY mode can be continued or should be terminated to return to the normal continuous receiving mode (normal stand-by). This determination is made by theMCU 18 when activated by the WFLAG interrupt at the end of the first repeat in each frame. By collecting the BCH-decoding status over a number of frames, the MER can be determined.

It is noted that, during the XSTBY mode, the determination of the MER from the BCH-decoding status may not be adequate, in that some frames may have been totally lost. As described previously, in XSTBY mode it becomes necessary to detect the Word Sync pattern of the beginning of each frame, and thus a frame can be lost if an error occurs in the Word Sync pattern. This phenomena is detected through the use of the timer 52 (or another timer) which is used to reactivate the MCU for each received frame. As such, the MCU 18 can maintain a frame count regardless of whether the detection of the word Sync pattern occurs. As the receiver is turned on, the MCU 18 activates the timer 52 to expire later than the WFLAG interrupt. If the Word Sync pattern is detected correctly, the WFLAG interrupt occurs on time, and the MCU then clears the timer 52. In this case this timer 52 is not required.

If the Word sync pattern is not received correctly, Word sync detection does not occur, and consequently the next WFLAG interrupt does not occur on time. Referring to FIG. 4b, the timer (step 9) eventually expires to wake up the MCU 18 and to indicate that a frame (WFLAG interrupt) was lost. The MCU 18 thus knows that if the timer interrupt occurs, the frame can be counted as an erroneous frame. As a result, the MER count is maintained in an accurate fashion. Thus, this timer is referred to as a back-up timer, because it is not required for normal operation, but only to indicate lost frames for MER counting. In practice, the programmable timer 52 can be used for two purposes, primarily to wake up the MCU to turn on the receiver at the end of a frame (step 6 in FIG. 4b), and secondarily as a back-up timer to indicate lost frames (step 9 in FIG. 4b).

By example only, the MER can be determined for each of the last n (for instance 14) frames, and if there are too many (for instance more than two) failures due to BCH-decoding failures or lost frames, the XSTBY mode is disabled.

As was noted above, the RSSI value can be used to augment the MER count during normal stand-by to determine if the XSTBY mode can be enabled. The RSSI is an analog signal provided from the RF circuitry 14 in a well known manner. The MCU 18 thus includes an analog to digital converter (ADC) to digitize the RSSI signal prior to reading same. Preferably, the RSSI values are collected over a period of time to determine an amount of variation in the RSSI value.

In a presently preferred embodiment of the invention, the extremes of the RSSI variation are determined for a predetermined period of time. If the difference between the extremes is below a predetermined threshold value, the XSTBY mode is enabled for use (so long as the MER value is also acceptable).

More particularly, the MCU 18 reads the RSSI value at each WFLAG interrupt (every 46.3 ms) and compares the value to the smallest (RSSI_MIN) and largest (RSSI_MAX) values obtained thus far. If the value just read is less than RSSI_MIN then the RSSI_MIN value is replaced with the RSSI value just read. In like manner the RSSI value is compared to RSSI_MAX and replaces same if larger. As a result, only two RSSI values (RSSI_MIN and RSSI_MAX) are required to be stored. Preferably, the time period within which to detect the RSSI variation is (n * 46.3 ms), where n may have a value within the range of, for example, 10–255. At the end of this period RSSI_MIN is subtracted from RSSI_MAX and, if the different is below a predetermined threshold value, the XSTBY mode can be enabled. At the end of the time period the RSSI_MIN and RSSI_MAX values are cleared or initialized in anticipation of the next time period of RSSI evaluation.

The use of the RSSI variation is useful in detecting the presence of short term fades, and to thus prevent the use of the XSTBY mode during a non-suitable reception period. However, the use of the RSSI variation in and of itself may not detect the presence of a stable and continuous disturbance that results in a high received signal strength. As such, the detected RSSI value variation is not used alone in making the XSTBY enabling determination, but is used instead with the afore described MER value. In this manner the RSSI variation provides an indication of RF link signal strength, and short term fades, while the MER value provides an indication of RF link quality.

A consideration in the detection of the Word Sync pattern is that an embedded Word Sync pattern not be inadvertently detected. For example, some message types described in section 3.7.1.3 of the IS-54-B Interim Standard allow an embedded Word Sync pattern to appear. This problem is overcome when operating in the XSTBY mode by also requiring that the bit synchronization (dotting) pattern also be detected in conjunction with the Word Sync pattern.

Figure 5:
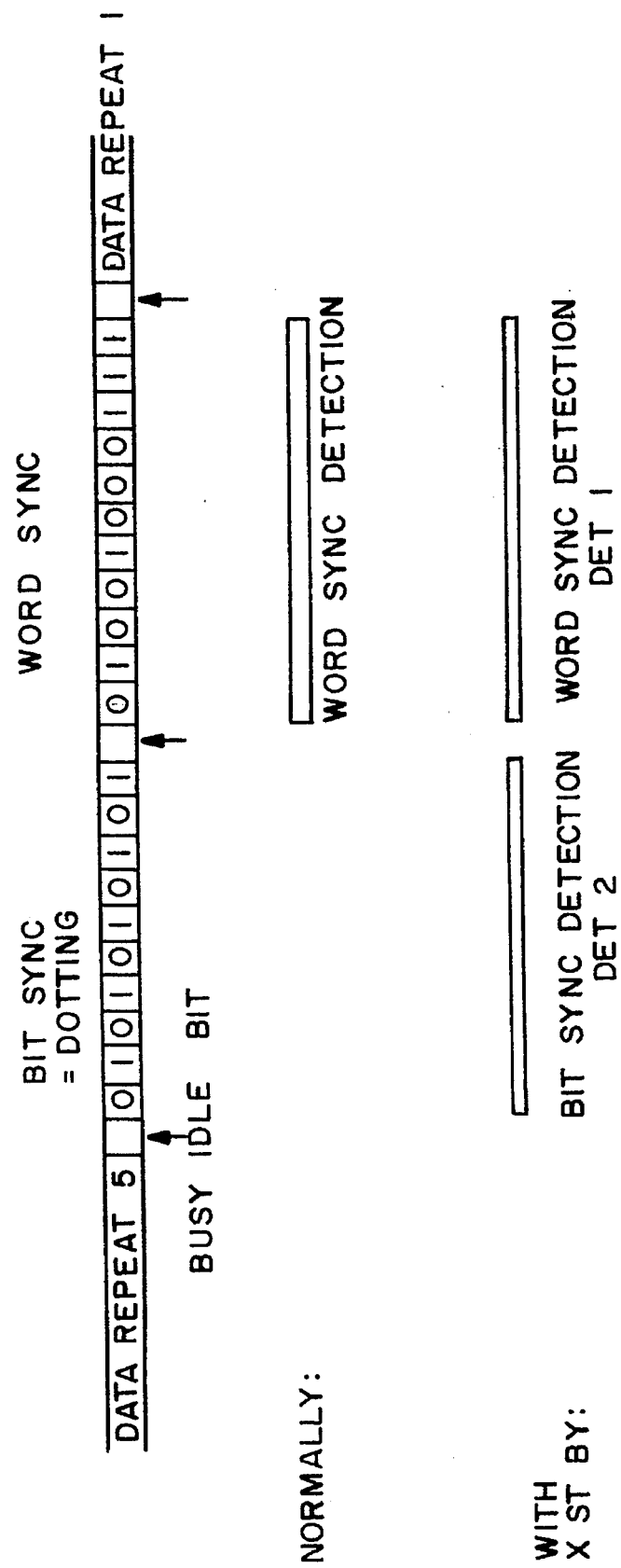
FIG. 5 shows an example of Bit Sync and Word Sync detection.
Figure 6:
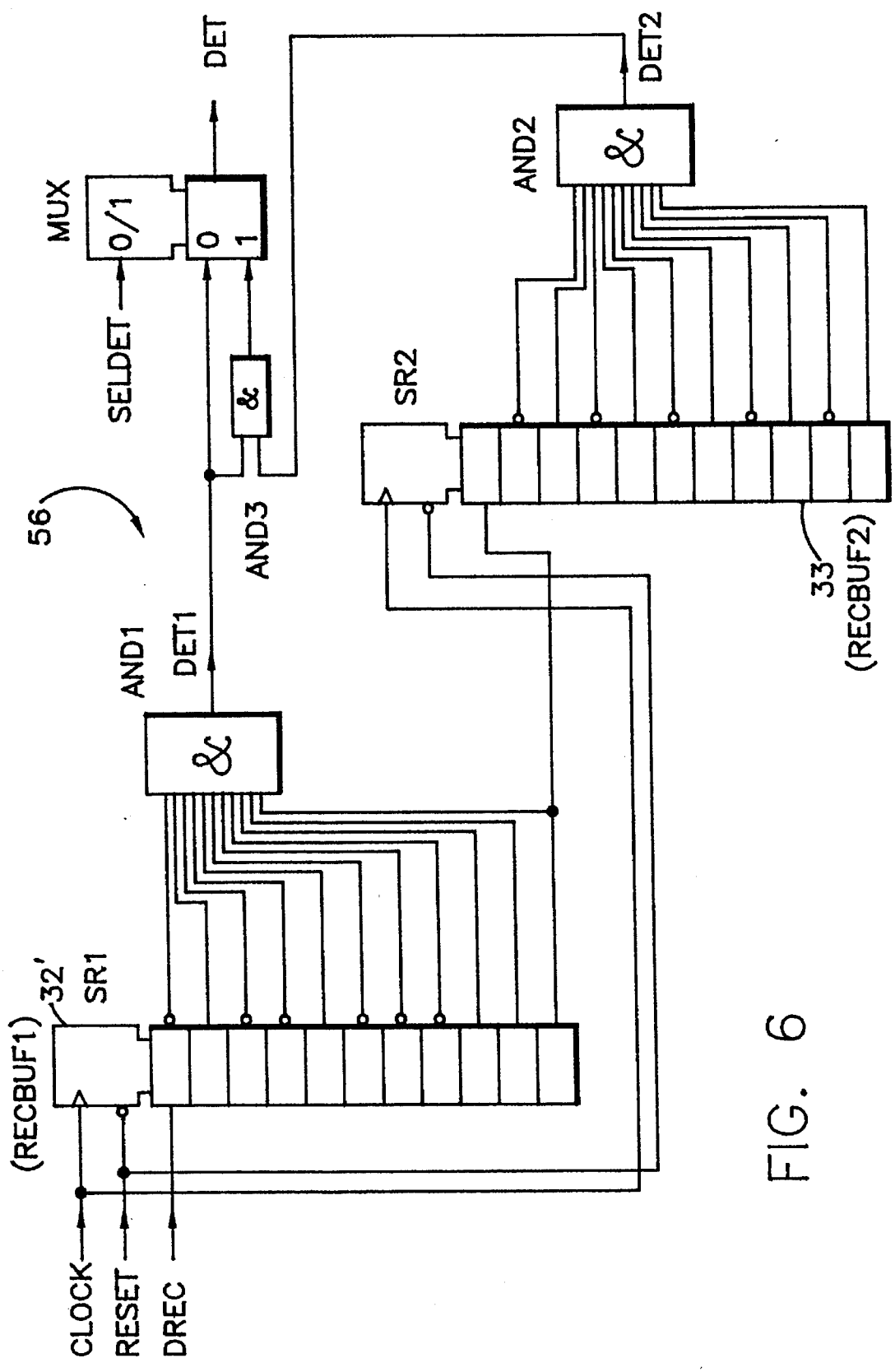
FIG. 6 is a logic diagram of circuitry suitable for generating a Bit and Word Sync Detection Signal (DET).

FIG. 5 shows an example of Bit Sync and Word Sync detection, while FIG. 6 is a logic diagram of circuitry 56 suitable for generating a combined Bit and Word Sync Detection Signal (DET) from a Bit Sync detection signal (DET2) and a Word Sync detection signal (DET1). In FIG. 6, alternately inverted and non-inverted outputs of shift register 2 (SR2) are applied to an AND gate (AND2) to generate the DET2 signal, while selectively inverted and non-inverted outputs which correspond to the Word Sync pattern are output from SR1 and applied to AND1 to generate the DET1 signal. The simultaneous presence of DET1 and DET2, as indicated by the output of AND3, is used, in conjunction with a multiplexer (MUX), to generate the DET signal in the XSTBY mode (one state of the SELDET MUX control signal), while during normal receiving only DET1 is used (as selected by the other state of the SELDET signal). The circuitry shown in FIG. 6 is generally indicated in FIG. 3a as the circuitry 56, the RECBUF 32', and the RECBUF2 33.

It should be realized that one result of receiving information over the FOCC paging channel is that the radiotelephone can be commanded to go to a digital traffic channel, as described in the IS-54-B Interim Standard. As such, the teaching of this invention finds utility in analog radiotelephones (such as AMPS/TACS radiotelephones), and also in dual-mode (analog/digital) radiotelephones.

While the invention has been particularly shown and described with respect to presently preferred embodiments thereof, it will be understood by those skilled in the art that changes in form and details may be made therein without departing from the scope and spirit of the invention. For example, the teaching of this invention is not intended to be read as being applicable to any one specific radiotelephone standard, for use with any one specific wireless channel, or for use with any one particular type of signaling format.

What is claimed is:

1. A method for reducing the power consumption of a radiotelephone, comprising the steps of:

receiving at least a Word Synchronization pattern during a transmitted frame;

receiving a first repeat of a message that follows the Word Synchronization pattern within the frame;

determining if the first repeat was correctly received;

if the first repeat was correctly received, determining if at least one reception-related criterion is met, wherein the at least one reception-related criterion is indicative of a characteristic of a received signal during a period of time that precedes the reception of at least the Word Synchronization pattern during the transmitted frame; and if the at least one reception-related criterion is determined to be met, selectively removing operating power from one or more portions of the radiotelephone for a predetermined time period during a remainder of the frame.

2. A method as set forth in claim 1 wherein the at least one reception-related criterion is a Message Error Rate (MER) that indicates a number of correctly received frames out of n last received frames.

3. A method as set forth in claim 2 wherein the at least one reception-related criterion includes a difference value between a minimum Received Signal Strength Indicator (RSSI) value and a maximum RSSI value that are detected during a predetermined interval of time that precedes the reception of at least the Word synchronization pattern.

4. A method as set forth in claim 3 wherein the at least one reception-related criterion is met if the MER is below a predetermined first threshold and if the RSSI difference value is below a predetermined second threshold.

5. A method as set forth in claim 2 wherein the at least one reception-related criterion is met if the MER is below a predetermined threshold.

6. A method as set forth in claim 1 and further including the steps of:

at the end of the predetermined time period, restoring power to at least a portion of receiver circuitry;

receiving with the receiver circuitry of the radiotelephone at least the Word Synchronization pattern from a next transmitted frame;

receiving the first repeat of the message that follows the Word Synchronization pattern within the next frame;

determining if the first repeat of the next frame was correctly received;

if the first repeat of the next frame was correctly received, determining if the at least one reception-related criterion is met; and if the at least one reception-related criterion is determined to be met, selectively removing operating power from the one or more portions of the radiotelephone for the predetermined time period during a remainder of the next frame.

7. A method as set forth in claim 6 wherein the step of restoring includes a step of reloading frequency divider values into a frequency synthesizer means.

8. A method as set forth in claim 7 wherein the radiotelephone includes a data processor control unit, and wherein the step of reloading is accomplished by circuitry that is external to the data processor control unit.

9. A method as set forth in claim 1 wherein the radiotelephone includes a data processor control unit, and wherein the step of receiving at least a Word Synchronization pattern includes a step of generating an interrupt signal for causing the data processor control unit to transition from a low power state to an operational state.

10. A method as set forth in claim 1 wherein the step of receiving the Word Synchronization pattern includes a preliminary step of receiving a dotting sequence that precedes the Word Synchronization pattern, and wherein the step of receiving at least a Word Synchronization pattern includes a further step of generating an interrupt signal for causing a data processor control unit of the radiotelephone to transition from a low power state to an operational state, the interrupt signal being generated only upon an occurrence of a reception of both the dotting sequence and also the Word Synchronization pattern.

11. A method as set forth in claim 1 and further including the steps of:

at the end of the predetermined time period, restoring power to at least a portion of receiver circuitry;

receiving at least the Word Synchronization pattern from a next transmitted frame;

receiving the first repeat of the control message that follows the Word Synchronization pattern within the next frame;

determining if the at least one reception-related criterion is met; and if the at least one reception-related criterion is determined not to be met, maintaining operating power to the radiotelephone receiver for the remainder of the next frame.

12. A method as set forth in claim 1, wherein the radiotelephone includes a data processor control unit, and wherein the steps of receiving the Word Synchronization pattern and receiving the first repeat are accomplished with circuitry that is external to the data processor control unit.

13. A method as set forth in claim 1, wherein the radiotelephone includes a data processor control unit, and wherein the step of determining if the first repeat is correctly received includes the steps of:

BCH-decoding, external to the data processor control unit, the received first repeat and generating at least one status signal;

generating an interrupt signal for causing the data processor control unit of the radiotelephone to transition from a low power state to an operational state; and reading the at least one status signal into the data processor control unit, the at least one status signal indicating if the message was received with at least one bit error or was received with no bit errors.

14. A method as set forth in claim 1, wherein the step of determining if the first repeat is correctly received includes the steps of:

generating an interrupt signal for causing a data processor control unit of the radiotelephone to transition from a low power state to an operational state;

reading the received first repeat into the data processor control unit; and

BCH-decoding the first repeat with the data processor control unit to determine if the message was received with at least one bit error or was received with no bit errors.

15. A method as set forth in claim 1 wherein the step of determining if at least one reception-related criterion is met is executed without regard for an identification of a destination for the message.

16. A radiotelephone, comprising:

means for receiving at least a Word Synchronization pattern during a frame that is transmitted over a control channel;

means for receiving a first repeat of a control message that follows the Word Synchronization pattern within the frame;

means for determining if the first repeat was correctly received;

means, responsive to the first repeat being correctly received, for determining if at least one reception-related criterion is met, wherein the at least one reception-related criterion is indicative of a characteristic of a received signal during a period of time that precedes the reception of at least the Word Synchronization pattern during the transmitted frame; and means, responsive to the at least one reception-related criterion being determined to be met, for selectively removing operating power from one or more portions of a receiver of the radiotelephone for a predetermined time period during a remainder of the frame.

17. A radiotelephone as set forth in claim 16 wherein the radiotelephone further comprises:

means for accumulating and voting a plurality of repeats of the control message within a frame;

means for BCH-decoding the voted result; and means, responsive to a result of the BCH decoding, for error correcting, if required, the voted result; and wherein said means for determining if the first repeat was correctly received is comprised of means for BCH-decoding only the first repeat.

18. A radiotelephone as set forth in claim 16 wherein the at least one reception-related criterion is a Message Error Rate (MER) that indicates a number of correctly received frames out of n last received frames.

19. A radiotelephone as set forth in claim 18 wherein the at least one reception-related criterion further includes a difference value between a minimum Received Signal Strength Indicator (RSSI) value and a maximum RSSI value that are detected during a predetermined interval of time that precedes the reception of at least the Word Synchronization pattern.

20. A radiotelephone as set forth in claim 19 wherein the at least one reception-related criterion is met if the MER is less than a predetermined first threshold and if the RSSI difference value is less than a predetermined second threshold.

21. A radiotelephone as set forth in claim 18 wherein the at least one reception-related criterion is met if the MER is less than a predetermined threshold.

22. A radiotelephone as set forth in claim 16 wherein said means for selectively removing operating power further includes means for restoring operating power, and further includes means for reloading frequency divider values into a frequency synthesizer means.

23. A radiotelephone as set forth in claim 22 wherein the radiotelephone includes a data processor control unit, and wherein said reloading means is comprised of circuitry that is external to the data processor control unit.

24. A radiotelephone as set forth in claim 16 wherein the radiotelephone includes a data processor control unit, and wherein said means for receiving at least a Word Synchronization pattern is external to said data processor control unit and includes means for generating an interrupt signal for causing the data processor control unit to transition from a low power state to an operational state.

25. A method for reducing the power consumption of a radiotelephone, comprising the steps of:

receiving with a radiotelephone at least a Word Synchronization pattern from a frame that is transmitted over an RF link;

receiving a first repeat of a message that follows the Word Synchronization pattern within the frame;

determining if the first repeat was correctly received;

if the first repeat was correctly received, determining if a predetermined criterion is met, the predetermined criterion being a function of at least a quality of the RF link over a period of time that precedes the reception of the Word Synchronization pattern; and if the predetermined criterion is determined to be met, selectively removing operating power from one or more portions of the radiotelephone for a predetermined time period during a remainder of the frame.

26. A method as set forth in claim 25 wherein the predetermined criterion is also a function of a signal strength of the RF link.

27. A method as set forth in claim 26 wherein the signal strength is determined as a difference value between a minimum Received Signal Strength Indicator (RSSI) value and a maximum RSSI value during a predetermined interval of time that precedes the reception of the word Synchronization pattern.

28. A method as set forth in claim 25 and including determining the quality of the RF link by the steps of:

for each frame wherein the Word Synchronization pattern is correctly received, generating an interrupt in response to the Word Synchronization pattern being correctly received to activate a control means so as to enable the control means to determine if the message is correctly received during that frame, thereby identifying that frame as a good frame, or is incorrectly received during that frame, thereby identifying that frame as a bad frame;

for each frame wherein the Word Synchronization pattern is not correctly received, activating the control means in response to a time-out of a timer means so as to enable the control means to identify that frame as a bad frame; and determining the quality of the RF link to be a ratio of a number of good frames to a number of bad frames.

* * * * *